Aug. 24, 1943.    C. KLEIN    2,327,354
BROILER MECHANISM
Filed Jan. 17, 1941
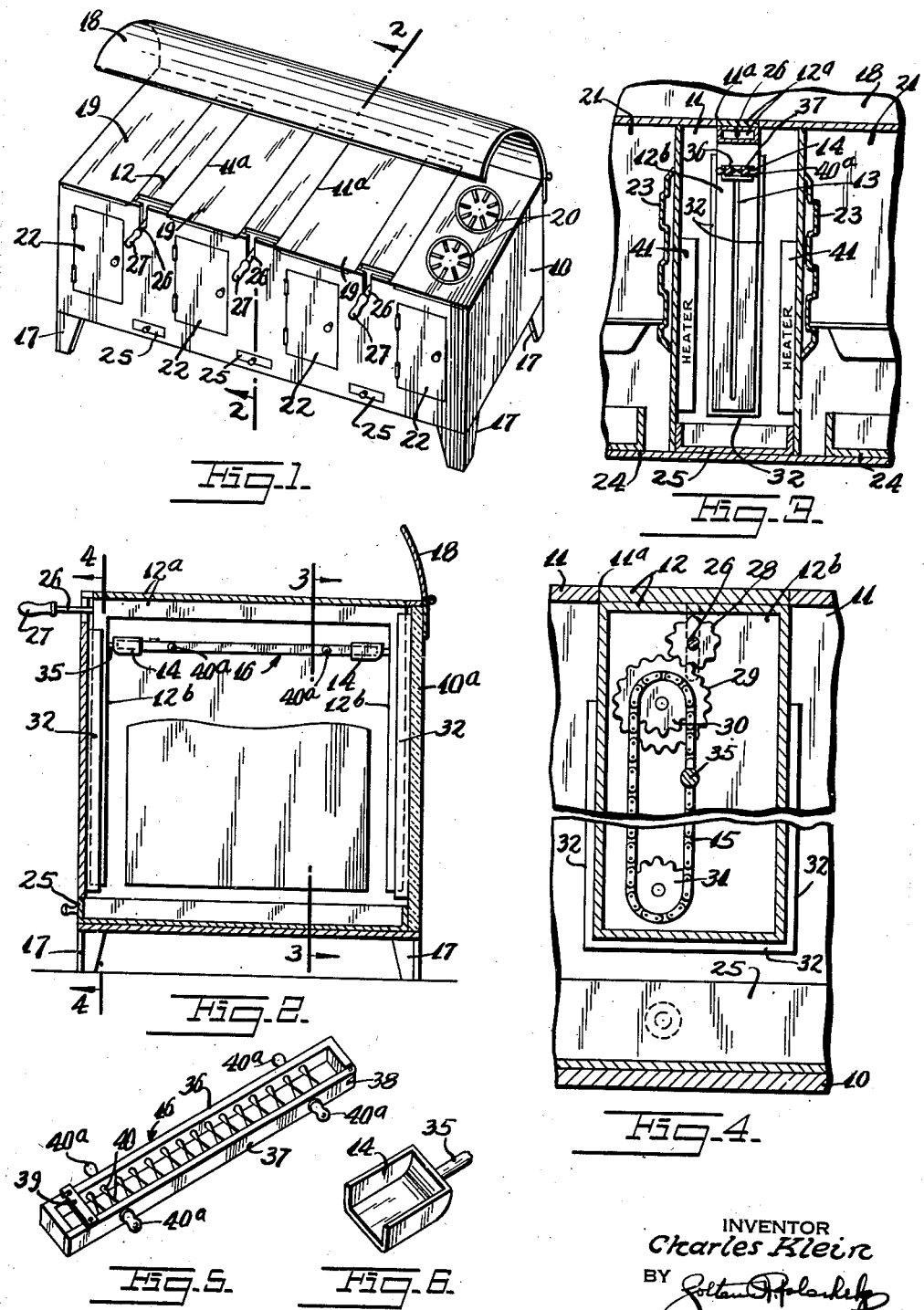
INVENTOR
Charles Klein
BY
ATTORNEY Patented Aug. 24, 1943

2,327,354

UNITED STATES PATENT OFFICE 2,327,354

BROILER MECHANISM

Charles Klein, Brooklyn, N. Y.

Application January 17, 1941, Serial No. 374,799

6 Claims. (Cl. 53—5)

This invention relates to new and useful improvements in a side burner stove.

More particularly, the invention proposes the construction in a stove, of a hollow casing having a broiling compartment open at the top, heaters mounted upon the sides of said broiling compartment, and mechanism for supporting a piece of meat, or other food to be broiled within said broiling compartment between said heaters.

Still further the invention proposes an arrangement by which the piece of meat or other food may be adjusted to various elevated positions within said broiling compartment.

Another object of the invention is to construct a stove provided with a plurality of broiling compartments and meat supporting devices as mentioned above.

Another object of the invention is to construct a stove that is provided with grilles between the broiling compartments. It is also contemplated to provide burners upon which foods may be boiled.

Still further the invention proposes to so construct the stove as to have roasting and baking compartments in addition to the broiling compartment previously mentioned.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a stove constructed in accordance with this invention.

Fig. 2 is a fragmentary vertical sectional view taken on the line 2—2 of Fig. 1.

Fig. 3 is a fragmentary transverse vertical sectional view taken on the line 3—3 of Fig. 2.

Fig. 4 is a fragmentary enlarged vertical sectional view taken on the line 4—4 of Fig. 2.

Fig. 5 is a perspective view of one of the gripping devices for holding the piece of meat or other food in the broiling compartment.

Fig. 6 is a perspective view of one of the support elements which is used to support the gripping means shown in Fig. 5.

The stove, in accordance with this invention, includes a hollow casing 10 with a transparent front panel 10a and plurality of broiling compartments 11 which are open at the top at the areas 11a. A member 12 is removably mounted in the open tops 11a of each of the broiling compartments, and has a top portion 12a extending along the said open top 11a, and a pair of spaced hollow side portions 12b (see Fig. 2) depending from the top portion 12a and having opposed vertical slots 13. A support element 14 projects from each slot 13. Means is provided for adjusting the support elements 14 to various elevated positions; and this adjusting means includes endless members 15 mounted in a certain way within the hollow side portions 35. Means is also provided for gripping a piece of meat, or other food to be broiled, indicated generally on the drawing by reference numeral 16. This means is normally mounted on two support elements 14.

The hollow casing 10 is supported on a plurality of legs 17. It is provided with a removable hood 18 extended across the top thereof for deflecting the heated air and fumes released by the oven. A removable grille 19 is arranged upon the top of the stove between each pair of the members 12, that is, at areas between the broiling compartments 11. At the extreme right the top of the stove is provided with several removable burners 20 which may be used for boiling purposes. The body 10 is provided with a plurality of roasting and baking compartments 21 having the usual burners or heaters, not illustrated on the drawing. Each compartment 21 is accessible from the rear side of the casing 10. This rear side is provided with a plurality of doors 22 controlling the accessibility of the roasting and baking compartments 21.

Within each roasting and baking compartment 21 there are the usual grooved wall brackets 23 for supporting the usual grilles, pans and other implements used within roasting and baking compartments. A drip pan 24 is removably mounted in the bottom of each roasting and baking compartment. Each broiling compartment 11 is also provided with a removable drip pan 25.

The member 12 is substantially of inverted U-shaped construction with the top portion 12a thereof comprising the joining section between the arms 12b thereof. A rod 26 extends through the top portion 12a and projects from the rear and is provided with a handle 27 by which the member 12 may be bodily lifted out of the broiling compartment 11. Moreover, the handle 27 may be utilized for turning the rod 26 for reasons which will become clear as this specification proceeds.

A gear 28 is mounted upon each end portion of the rod 26 within the hollow top portion 12a at points superimposed above the hollow side portions 12b. The gears 28 mesh with gears 29 rotatively supported on side walls of the side portions 12b. These gears 29 are coaxially connected with sprockets 30 over which the endless elements or chains 15 pass. The bottom ends of the endless chains 15 engage over idler sprockets 31 rotatively supported on the walls of the side portions 12b. Guide elements 32 are mounted within the casing 10, on the front and rear walls thereof, and serve to guide the said hollow side portions 12b to slide vertically relative to said guide elements. The arrangement is such that the tracks 32 facilitate the removal of the members 12 and facilitate their re-engagement in proper positions within the broiling compartments 11.

The support elements 14 have shank portions 35 which extend through the slots 13 in the opposed walls of the side portions 12b. These shanks 35 are fixedly connected with one point or with one of the links of the endless elements 15 which preferably comprise chains. The side portions of the chains 15 extend along the lengths of the slots 13. The arrangement is such that the handle 27 may be turned to move the chains 15 which in turn raise or lower the support elements 14.

The means 16 for gripping a piece of meat or other food comprises a pair of parallel bars 36 and 37 which are connected at one of their ends by a hinge construction 38 and are releasably connected at their other ends by a latch device 39. A plurality of sharp pointed elements 40 project inwardly from adjacent faces of the bars 36 and 37 and are adapted to grip the food which is to be supported. A plurality of insulated handles 40a project from the bars 36 and 37 for placing or removing these bars. The ends of the bars 36 and 37 are adapted to engage the support elements 14 which are in the form of receiving buckets.

Each broiling compartment 11 has heaters 41 mounted on its sides. These heaters may be operated with electricity, gas, etc., and should be of sufficient size to heat and broil food at the grille 19.

The operation of the device is as follows:

When it is desired to broil a piece of food, one of the members 12 is removed by gripping its handle 27 and lifting the same to remove the member from its position. Then the gripping means 16 is removed from the support elements 14 and is locked on to the food. It is placed back into position, and the member 12 is re-engaged in position in the broiling compartment. The handle 27 may be rotated to indirectly cause the elevation of the support elements 14 to be changed so as to properly position the food in relation to the heaters 41.

It is to be understood that size and proportion of the baking compartment 21 may be changed as desired, and the heating units may be at either side of these compartments with suitable insulations.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described having a broiling compartment with an open top and vertical guide members extended downwards from said open top and mounted on opposed walls of said broiling compartment, an inverted U-shaped member of hollow construction having a top portion extending along and closing the open top of said broiling compartment and side arms depending from the ends of said top portion and slidably engaging said guide members, and means for supporting a piece of meat between the side arms of said U-shaped member to depend vertically within said broiling compartment.

2. In a device of the class described having a broiling compartment with an open top and vertical guide members extended downwards from said open top and mounted on opposed walls of said broiling compartment, an inverted U-shaped member of hollow construction having a top portion extending along and closing the open top of said broiling compartment and side arms depending from the ends of said top portion and slidably engaging said guide members, and means for supporting a piece of meat between the side arms of the said U-shaped member to depend vertically within said broiling compartment, said means, comprising support elements mounted on the inner faces of said side arms and directed towards each other, and a member for gripping and holding a piece of meat and having its ends resting on said support elements.

3. In a device of the class described having a broiling compartment with an open top and vertical guide members extended downwards from said open top and mounted on opposed walls of said broiling compartment, an inverted U-shaped member of hollow construction having a top portion extending along and closing the open top of said broiling compartment and side arms depending from the ends of said top portion and slidably engaging said guide members, and means for supporting a piece of meat between the side arms of said U-shaped member to depend vertically within said broiling compartment, said means, comprising support elements mounted on the inner faces of said side arms and directed towards each other, a member for gripping and holding a piece of meat and having its ends resting on said support elements, and means for changing the elevation of said support elements relative to the side arms of said U-shaped member for supporting said piece of meat at a desired elevation within said broiling compartment.

4. In a device of the class described having a broiling compartment with an open top and vertical guide members extended downwards from said open top and mounted on opposed walls of said broiling comparment, an inverted U-shaped member of hollow construction having a top portion extending along and closing the open top of said broiling compartment and side arms depending from the ends of said top portion and slidably engaging said guide members, and means for supporting a piece of meat between the side arms of said U-shaped member to depend vertically within said broiling compartment, said means, comprising support elements mounted on the inner faces of said side arms and directed towards each other, a member for gripping and holding a piece of meat and having its ends resting on said support elements, and means for changing the elevation of said support elements relative to the side arms of said U-shaped member for supporting said piece of meat at a desired elevation within said broiling compartment, said latter means, comprising a shaft rotatively extended through the top portion of said shaft above said side arms, sprockets mounted on said side arms adjacent said gears, gears mounted concentric with said sprockets and meshing with said gears for causing said sprockets to rotate as said shaft is turned, idler sprockets rotatively supported on the bottom ends of said side arms, and sprocket chains engaged over said sprockets and upon which said support elements are mounted.

5. In a device of the class described having a broiling compartment with an open top and vertical guide members extended downwards from said open top and mounted on opposed walls of said broiling compartment, an inverted U-shaped member of hollow construction having a top portion extending along and closing the open top of said broiling compartment and side arms depending from the ends of said top portion and slideably engaging said guide members, and means for supporting a piece of meat between the side arms of said U-shaped member to depend vertically within said broiling compartment, said means, comprising support elements mounted on the inner faces of said side arms and directed towards each other and a member for gripping and holding a piece of meat and having its ends resting on said support elements, and means for changing the elevation of said support elements relative to the side arms of said U-shaped member for supporting said piece of meat at a desired elevation within said broiling compartment, said latter means, comprising a shaft rotatively extended through the top portion of said inverted U-shaped member, spaced gears mounted on said shaft above said side arms, sprockets mounted on said side arms adjacent said gears, gears mounted concentric with said sprockets and meshing with said gears for causing said sprockets to rotate as said shaft is turned, idler sprockets rotatively supported on the bottom ends of said side arms, and sprocket chains engaged over said sprockets and upon which said support elements are mounted, said gripping and holding member, comprising a pair of slightly spaced parallel bars pivotally connected together at one of their ends, a latch connecting together at one of their ends, said bars, and means mounted on the adjacent inner faces of said bars for engaging a piece of meat.

6. In a device of the class described having a broiling compartment with an open top and vertical guide members extended downwards from said open top and mounted on opposed walls of said broiling compartment, an inverted U-shaped member of hollow construction having a top portion extending along and closing the open top of said broiling compartment and side arms depending from the ends of said top portion and slidably engaging said guide members, and means for supporting a piece of meat between the side arms of said U-shaped member to depend vertically within said broiling compartment, said means, comprising support elements mounted on the inner faces of said side arms and directed towards each other, and a member for gripping and holding a piece of meat and having its ends resting on said support elements, said gripping and holding member, comprising a pair of slightly spaced parallel bars pivotally connected together at one of their ends, a latch connecting together the other ends of said bars, and means mounted on the adjacent inner faces of said bars for engaging a piece of meat, said latter means, comprising a plurality of cooperative pairs of pointed elements mounted on said bars.

CHARLES KLEIN.